United States Patent
Yoo et al.

(10) Patent No.: US 8,109,736 B2
(45) Date of Patent: Feb. 7, 2012

(54) APPARATUS AND METHOD FOR CONTROLLING OPERATION OF A LINEAR COMPRESSOR USING A PHASE DIFFERENCE INFLECTION POINT DETECTING UNIT

(75) Inventors: Jae-Yoo Yoo, Gyeonggi-Do (KR); Ji-Won Sung, Seoul (KR); Chel-Woong Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 874 days.

(21) Appl. No.: 12/087,772

(22) PCT Filed: Dec. 28, 2006

(86) PCT No.: PCT/KR2006/005841
§ 371 (c)(1),
(2), (4) Date: Jul. 15, 2008

(87) PCT Pub. No.: WO2007/081103
PCT Pub. Date: Jul. 19, 2007

(65) Prior Publication Data
US 2009/0047138 A1    Feb. 19, 2009

(30) Foreign Application Priority Data
Jan. 16, 2006  (KR) .................. 10-2006-0004619

(51) Int. Cl.
*F04B 49/06*  (2006.01)
*H02P 1/00*  (2006.01)

(52) U.S. Cl. .................. 417/44.11; 318/135; 417/53

(58) Field of Classification Search ............... 417/44.11, 417/44.1, 53, 212, 45, 417; 318/632, 135
See application file for complete search history.

(56) References Cited

U.S. PATENT DOCUMENTS

| | | | |
|---|---|---|---|
| 7,025,571 B2 * | 4/2006 | Jeun | 318/400.08 |
| 2003/0026702 A1 * | 2/2003 | Yoo et al. | 417/44.11 |
| 2003/0143080 A1 * | 7/2003 | Yoo et al. | 417/44.1 |

FOREIGN PATENT DOCUMENTS

| KR | 10-2002-0024897 A | 4/2002 |
|---|---|---|
| KR | 10-2002-0056757 A | 7/2002 |
| KR | 10-2003-0012262 A | 2/2003 |
| KR | 10-2003-0012263 A | 2/2003 |
| KR | 10-2005-0082880 A | 8/2005 |

* cited by examiner

*Primary Examiner* — Devon C Kramer
*Assistant Examiner* — Nathan Zollinger
(74) *Attorney, Agent, or Firm* — McKenna Long & Aldridge LLP

(57) ABSTRACT

An apparatus and method for controlling an operation of a linear compressor by detecting a phase difference inflection point at a time point when a phase difference between a current and a stroke is placed within a certain region, and by recognizing the phase difference infection point as a top dead center (TDC)=O. The apparatus for controlling an operation of a linear compressor, comprises: a controlling unit for detecting a phase difference between a current and a stroke, and outputting a frequency varying signal or a phase difference inflection point detecting signal based on the detected phase difference; a phase difference inflection point detecting unit for judging whether to detect a phase difference inflection point or not by the phase difference inflection point detecting signal, and outputting a stroke command value controlling signal based on a result of the judgement; and a stroke command value determining unit for determining a stroke command value based on the stroke command value controlling signal.

20 Claims, 4 Drawing Sheets

RELATED ART

APPARATUS AND METHOD FOR CONTROLLING OPERATION OF A LINEAR COMPRESSOR USING A PHASE DIFFERENCE INFLECTION POINT DETECTING UNIT

This application is a 371 national stage filing of International Application No. PCT/KR2006/005841, filed Dec. 28, 2006 and claims priority to Korean Application No. 10-2006-0004619, filed Jan. 16, 2006, each of which are incorporated by reference in their entireties, as if fully set forth herein.

TECHNICAL FIELD

The present invention relates to a compressor, and more particularly, to an apparatus and method for controlling an operation of a linear compressor by detecting a phase difference inflection point at a time point when a phase difference between a current and a stroke is placed within a certain region, and by recognizing the phase difference infection point as a top dead center (TDC)=0.

BACKGROUND ART

Generally, a reciprocating compressor sucks, compressed, and then discharges refrigerant gas by linearly reciprocating a piston in a cylinder. The compressor is divided into a reciprocating compressor and a linear compressor according to a driving method of the piston.

In the reciprocating compressor, a crankshaft is coupled to a rotary motor and a piston is coupled to the crankshaft, thereby converting a rotation force of the rotary motor into a reciprocation force.

In the linear compressor, a piston connected to a mover of a linear motor is linearly moved.

The linear compressor is not provided with a crank shaft for converting a rotation motion into a linear motion thus not to have a frictional loss due to the crank shaft, thereby having a higher compression efficiency than a general compressor.

When the linear compressor is applied to a refrigerator or an air conditioner, a compression ratio of the linear compressor is varied by varying a voltage applied to a motor inside the linear compressor. Accordingly, a cooling capacity of the refrigerator or the air conditioner is controlled.

When the linear compressor is applied to a refrigerator or an air conditioner, a compression ratio of the linear compressor is varied by varying a stroke voltage applied to the linear compressor. Accordingly, a cooling capacity of the refrigerator or the air conditioner is controlled. Herein, the stroke denotes a distance between an upper dead point of the piston and a lower dead point of the piston.

The related art linear compressor will be explained with reference to FIG. 1.

FIG. 1 is a block diagram showing a driving controlling apparatus for a linear compressor in accordance with the related art.

As shown in FIG. 1, the related art driving controlling apparatus for a linear compressor comprises a current detecting unit 4 for detecting a current applied to a motor (not shown) of the linear compressor 6; a voltage detecting unit 3 for detecting a voltage applied to the motor of the linear compressor 6; a stroke calculating unit 5 for calculating a stroke estimation value of the linear compressor based on the detected current, the detected voltage, and a parameter of the motor; a comparing unit 1 for comparing the calculated stroke estimation value with a preset stroke command value, and outputting a difference value therebetween; and a stroke controlling unit 2 for controlling a turn-on period of a triac (not shown) serially connected to the motor based on the difference value so as to vary a voltage applied to the motor, and thereby controlling a stroke of the linear compressor 6.

Hereinafter, an operation of the driving controlling apparatus for a linear compressor will be explained with reference to FIG. 1.

The current detecting unit 4 detects a current applied to a motor (not shown) of the linear compressor 6, and outputs the detected current to the stroke calculating unit 5.

The voltage detecting unit 3 detects a voltage applied to the motor of the linear compressor 6, and outputs the detected voltage to the stroke calculating unit 5.

The stroke calculating unit 5 calculates a stroke estimation value (X) of the linear compressor by substituting the detected current, the detected voltage, and a parameter of the motor into a following equation 1. Then, the stroke calculating unit 5 applies the calculated stroke estimation value (X) to the comparing unit 1.

$$X = \frac{1}{\alpha} \int (V_M - Ri - L\dot{i}) dt \qquad \text{Equation 1}$$

The R denotes a resistance of the motor, the L denotes an inductance of the motor, the α denotes a constant of the motor, the $V_M$ denotes a voltage applied to the motor, the i denotes a current applied to the motor, and the $\dot{i}$ denotes a variation ratio of the current applied to the motor according to time. That is, the $\dot{i}$ is a differential value of the i (di/dt).

The comparing unit 1 compares the stroke estimation value with the stroke command value, and applies a difference value therebetween to the stroke controlling unit 2.

The stroke controlling unit 2 varies a voltage applied to the motor of the linear compressor 6 based on the difference value, thereby controlling the stroke of the linear compressor 6.

FIG. 2 is a flowchart showing a method for controlling an operation of a linear compressor in accordance with the related art.

Referring to FIG. 2, a stroke estimation value obtained by the stroke calculating unit 5 is applied to the comparing unit 1 (S1). Then, the comparing unit 1 compares the stroke estimation value with a preset stroke command value (S2), and outputs a difference value therebetween to the stroke controlling unit 2.

When the stroke estimation value is smaller than the stroke command value, the stroke controlling unit 2 increases a voltage applied to the motor so as to control a stroke of the linear compressor (S3). On the contrary, when the stroke estimation value is larger than the stroke command value, the stroke controlling unit 2 decreases the voltage applied to the motor (S4).

Herein, the voltage applied to the motor is increased or decreased by controlling a turn-on period of a triac (not shown) electrically connected to the motor.

The stroke command value is varied according to a size of a load of the linear compressor. More concretely, when the load is large, the stroke command value is increased thus to increase the stroke of the piston, thereby preventing decrease of a cooling capacity.

On the contrary, when the load is small, the stroke command value is decreased thus to decrease the stroke of the piston, thereby preventing increase of the cooling capacity and preventing a collision between the piston and the cylinder due to an over stroke.

In the related art method for controlling an operation of a linear compressor, a stroke estimation value of the linear compressor is calculated based on a parameter of a motor, a resistance and a reactance. Then, a stroke control is performed based on the stroke estimation value.

However, when the stroke estimation value is calculated, an error occurs according to a deviation of the parameter and each component thus not to precisely perform the stroke control. Accordingly, the piston is not placed to TDC=0, thereby degrading a reliability of the apparatus.

DISCLOSURE OF THE INVENTION

Therefore, it is an object of the present invention to provide an apparatus and method for controlling an operation of a linear compressor by detecting a phase difference inflection point at a time point when a phase difference between a current and a stroke is placed within a certain region, and by recognizing the phase difference infection point as a top dead center (TDC)=0.

To achieve these objects, there is provided an apparatus for controlling an operation of a linear compressor, comprising: a controlling unit for detecting a phase difference between a current and a stroke, and outputting a frequency varying signal or a phase difference inflection point detecting signal based on the detected phase difference; a phase difference inflection point detecting unit for judging whether to detect a phase difference inflection point or not by the phase difference inflection point detecting signal, and outputting a stroke command value controlling signal based on a result of the judgement; and a stroke command value determining unit for determining a stroke command value based on the stroke command value controlling signal.

To achieve these objects, there is also provided a method for controlling an operation of a linear compressor, comprising: driving a linear compressor with a capacity corresponding to a certain stroke command value; detecting a voltage and a current applied to a motor, and calculating a stroke based on the voltage and current; detecting a phase difference between the stroke and the current; comparing the detected phase difference with a preset value, and detecting a phase difference inflection point based on a result of the comparison; and detecting a TDC according to whether the phase difference inflection point has been detected, and then varying a stroke command value according to a load.

MODES FOR CARRYING OUT THE PREFERRED EMBODIMENTS

Reference will now be made in detail to the preferred embodiments of the present invention, examples of which are illustrated in the accompanying drawings.

Hereinafter, with reference to FIGS. 3 and 4, will be explained an apparatus and method for controlling an operation of a linear compressor by detecting a phase difference inflection point at a time point when a phase difference between a current and a stroke is placed within a certain region, and by recognizing the phase difference infection point as a top dead center (TDC)=0.

In the present invention, a maximum driving efficiency is implemented when the phase difference between a current and a stroke is placed within a certain region and the phase difference infection point is regarded as a top dead center (TDC)=0.

The TDC represents a 'Top Dead Center' point of the piston of the linear compressor, and denotes a position of the piston when a compression process of the piston is completed.

Since the linear compressor has the most excellent efficiency when the TDC is 0, the piston is controlled so as to be positioned at a point of TDC=0.

Figure 1:
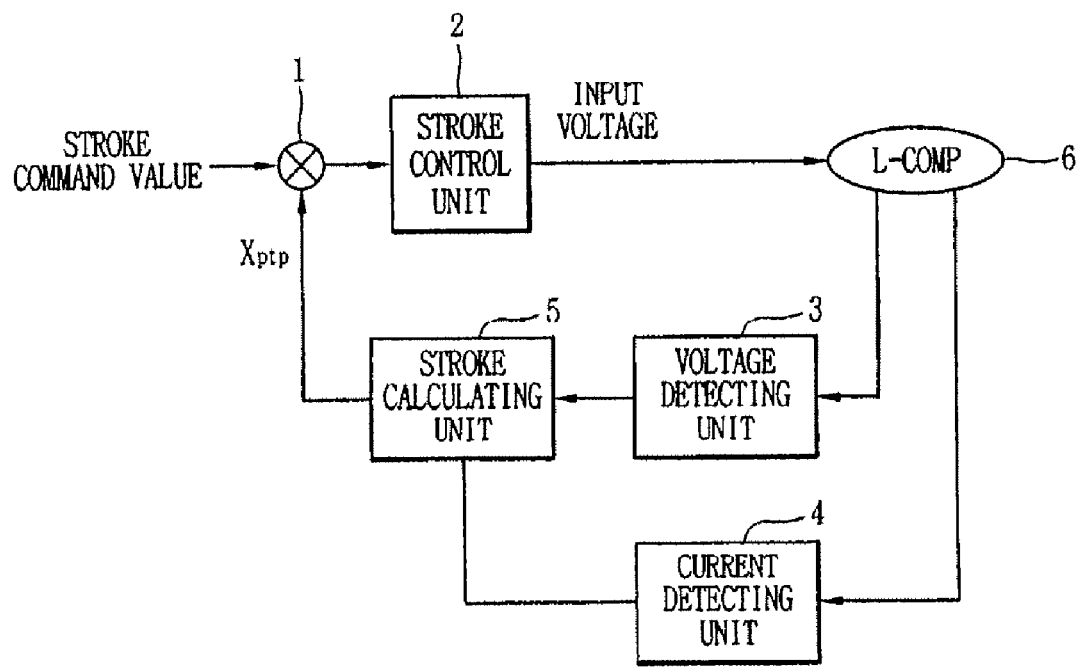
FIG. 1 is a block diagram showing a configuration of a method for operating a linear compressor in accordance with the conventional art.
Figure 2:
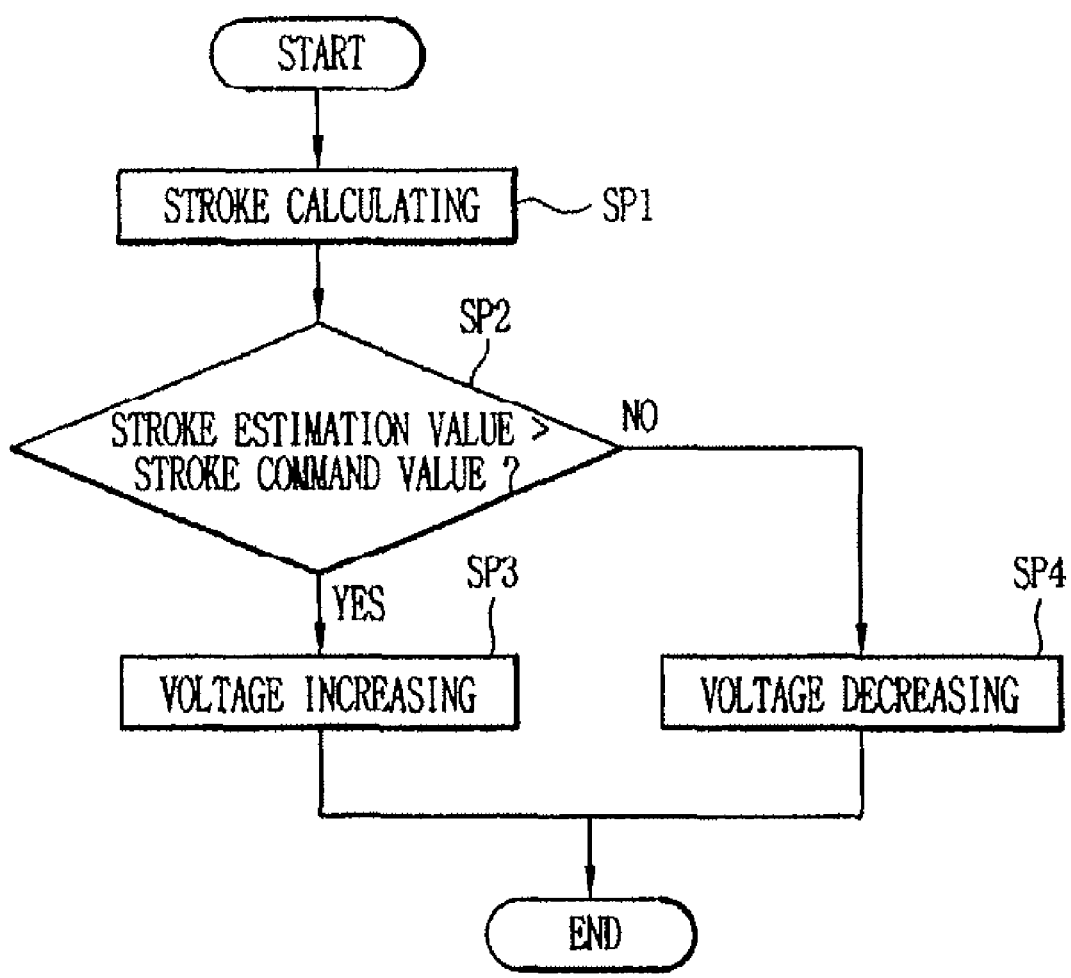
FIG. 2 is a flowchart showing a method for operating a linear compressor in accordance with the conventional art.
Figure 3:
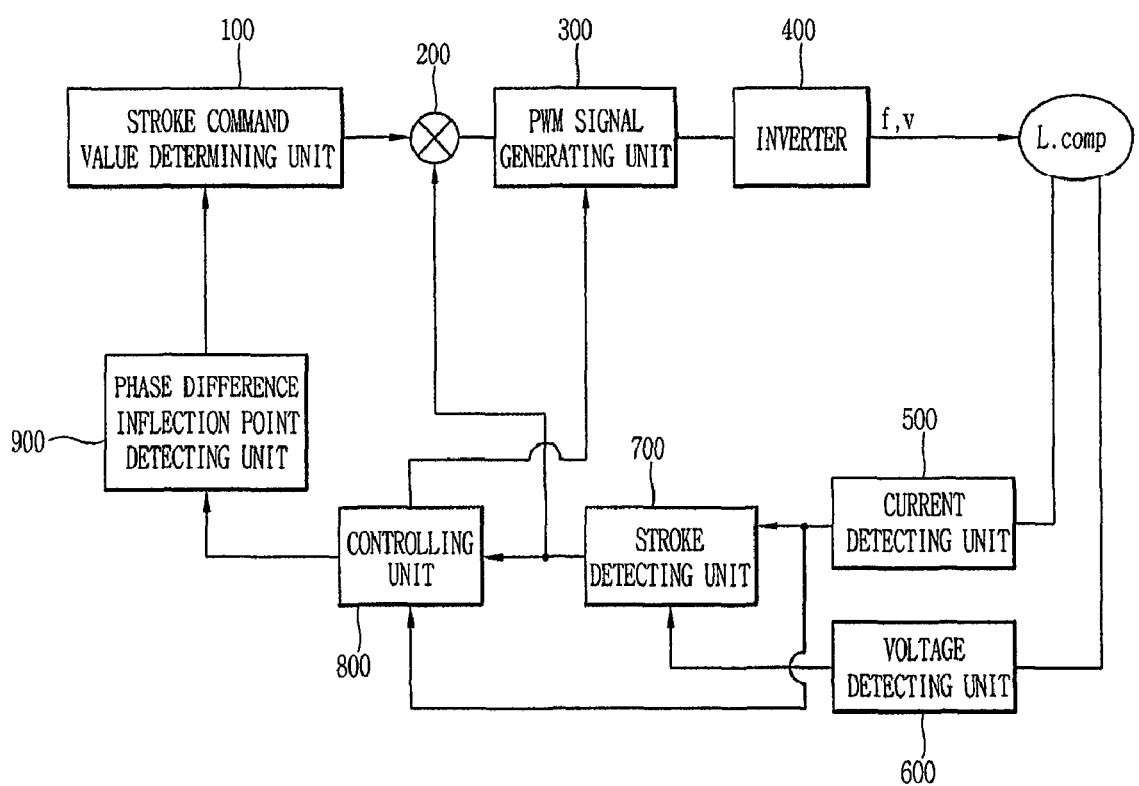
FIG. 3 is a block diagram showing a configuration of an apparatus for operating a linear compressor according to the present invention.
Figure 4:
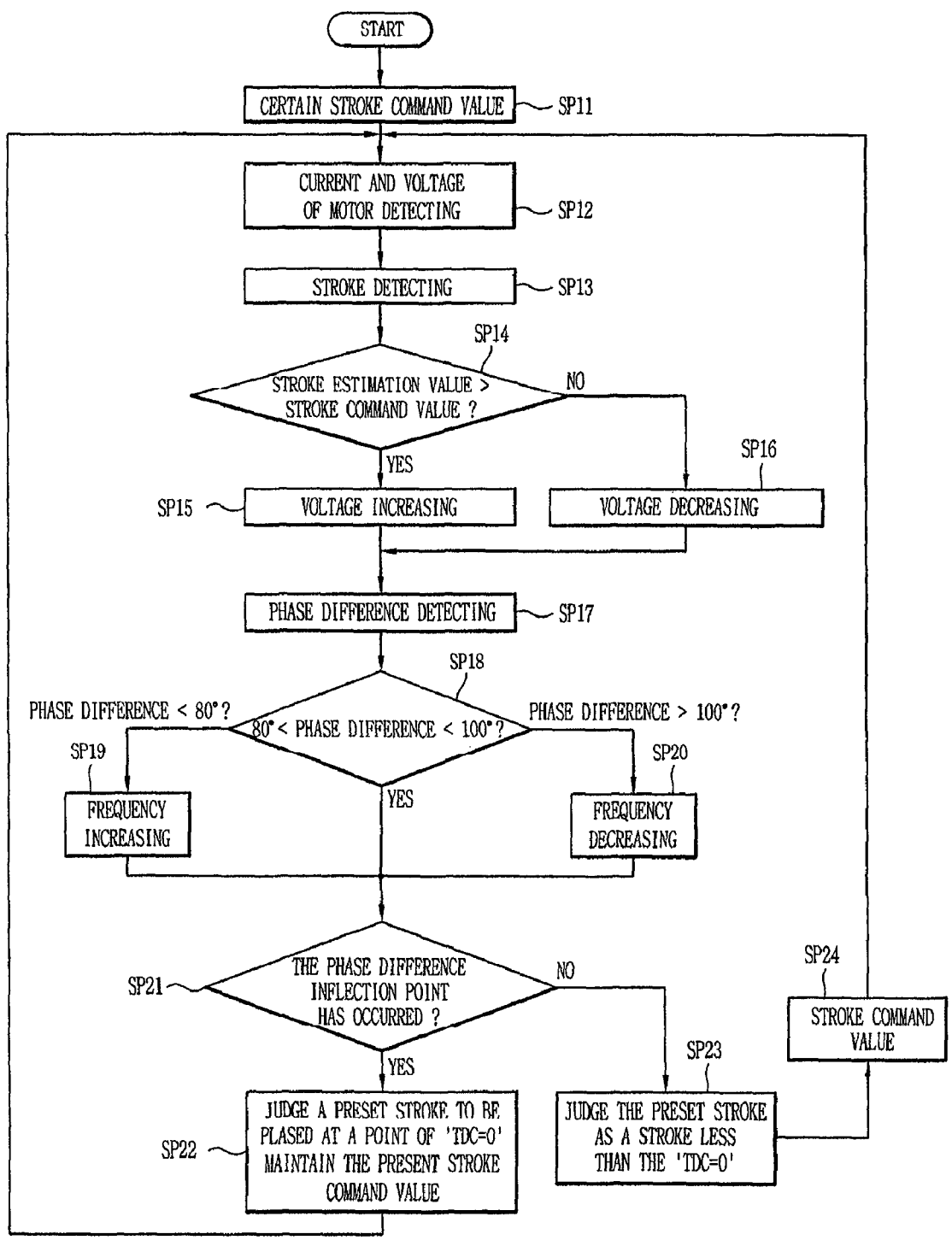
FIG. 4 is a flowchart showing a method for operating a linear compressor according to the present invention.

FIG. 3 is a block diagram showing a configuration of an apparatus for operating a linear compressor according to the present invention.

As shown, the apparatus for controlling an operation of a linear compressor according to the present invention comprises a stroke command value determining unit 100, a comparing unit 200, a PWM signal generating unit 300, an inverter 400, a current detecting unit 500, a voltage detecting unit 600, a stroke detecting unit 700, a controlling unit 800, and a phase difference inflection point detecting unit 900.

The current detecting unit 500 detects a current applied to a motor of a linear compressor, and the voltage detecting unit 600 detects a voltage applied to the motor of the linear compressor.

The stroke detecting unit 700 calculates a stroke by using the detected current and the detected voltage.

The controlling unit 800 detects a phase difference between the detected current and the stroke, and outputs a frequency varying signal or a phase difference inflection point detecting signal based on the detected phase difference.

That is, when the detected phase difference is within a preset range, the controlling unit 800 outputs a phase difference inflection point detecting signal. On the contrary, when the detected phase difference is not within the preset range, the controlling unit 800 outputs a frequency varying signal.

As another embodiment, the controlling unit 800 calculates a speed of a stroke by the stroke detecting unit 700, and calculates a phase difference between the speed and the current. Then, the controlling unit 800 compares the detected phased difference with a reference phase difference, thereby outputting a frequency varying signal or a phase difference inflection point detecting signal. That is, when the detected phase difference is within a preset range, the controlling unit 800 outputs a phase difference inflection point detecting signal. On the contrary, when the detected phase difference is not within the preset range, the controlling unit 800 outputs a frequency varying signal.

The PWM signal generating unit 300 generates a PWM signal for varying a frequency of a voltage applied to a motor based on the frequency varying signal, and the inverter 400 varies a voltage and a frequency applied to the motor of the linear compressor based on the PWM signal.

The PWM signal generating unit 300 analyzes the frequency varying signal. When the phase difference is more than a preset value, the PWM signal generating unit 300 generates a PWM signal to increase a frequency. However, when the phase difference is less than the preset value, the PWM signal generating unit 300 generates a PWM signal to decrease a frequency.

The phase difference inflection point detecting unit 900 judges whether to detect a phase difference inflection point according to the phase difference inflection point detecting signal outputted from the controlling unit 800, and outputs a stroke command value controlling signal based on a result of the judgement.

When a phase difference inflection point is detected by the phase difference inflection point detecting signal, the phase difference inflection point detecting unit 900 outputs a control signal to maintain a present stroke command value. On the contrary, when the phase difference inflection point is not detected by the phase difference inflection point detecting signal, the phase difference inflection point detecting unit 900 outputs a control signal to increase a present stroke command value.

When the phase difference is more than a minimum value within a preset range, the phase difference inflection point detecting unit 900 detects the time point as a phase difference inflection point.

The stroke command value determining unit 100 determines a stroke command value based on the stroke command value controlling signal.

An operation of the apparatus for controlling an operation of a linear compressor according to the present invention will be explained with reference to FIG. 4.

The linear compressor is operated with a certain stroke command value (SP11).

Then, the current detecting unit 500 detects a current of a motor of the linear compressor, and the voltage detecting unit 600 detects a voltage of the motor of the linear compressor (SP12).

Then, the stroke detecting unit 700 calculates a stroke by using the detected current and the detected voltage (SP13).

Then, the comparing unit 200 calculates a difference value between the stroke command value and the stroke. The PWM signal generating unit 300 generates a PWM signal corresponding to the difference value thus to apply it to the inverter 400. Then, the inverter 400 varies a frequency and a voltage according to the PWM signal, and applies them to a motor of the linear compressor (SP14 to SP16).

The controlling unit 800 detects a phase difference between the detected current and the stroke (SP17), and outputs a frequency varying signal or a phase difference inflection point detecting signal based on the detected phase difference.

As another embodiment, the controlling unit 800 calculates a speed of a stroke, and detects a phase difference between the speed and the current. Then, the controlling unit 800 outputs a frequency varying signal or a phase difference inflection point detecting signal based on the detected phase difference.

Then, the controlling unit 800 compares the phase difference between the stroke and the current with a preset phase difference (a value within an approximate range of 80°~100°). When the detected phase difference is within a preset range, the controlling unit 800 outputs a phase difference inflection point detecting signal.

Then, the phase difference inflection point detecting unit 900 judges whether a phase difference inflection point has occurred by the phase difference inflection point detecting signal. If it is judged that the phase difference inflection point has occurred (SP21), the phase difference inflection point detecting unit 900 judges a present stroke to be placed at a point of 'TDC=0' thus to maintain the present stroke command value (SP22). On the contrary, if it is judged that the phase difference inflection point has not occurred, the phase difference inflection point detecting unit 900 judges the present stroke as a stroke less than the 'TDC=0' (SP23) thus to increase the present stroke command value (SP24).

When the phase difference between the stroke and the current is more than a preset range, the controlling unit 800 increases a frequency by increasing a duty ratio of the PWM signal (SP20). On the contrary, when the phase difference between the stroke and the current is less than the preset range, the controlling unit 800 decreases a frequency by decreasing a duty ratio of the PWM signal (SP19).

That is, in the present invention, a frequency is varied so that a phase difference between a current and a stroke may be placed within a certain region. If the phase difference between the current and the stroke is within a certain region, a phase difference inflection point is detected thus to be recognized as a 'TDC=0'.

The present invention has the following effects.

First, a phase difference between a current and a pulse width modulation (PWM) voltage is calculated, a phase delay value to compensate the phase difference is calculated, and a reference current is delayed by the calculated phase delay value thus to remove a distortion phenomenon of a current. Accordingly, a driving efficiency of the compressor is enhanced, and a TDC is precisely controlled.

It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

The invention claimed is:

1. An apparatus for controlling an operation of a linear compressor, comprising:
    a controlling unit for detecting a phase difference between a current and a stroke, and outputting a frequency varying signal or a phase difference inflection point detecting signal based on the phase difference;
    a phase difference inflection point detecting unit for judging whether to detect a phase difference inflection point or not by the phase difference inflection point detecting signal, and outputting a stroke command value controlling signal based on a result of the judgment;
    a stroke command value determining unit for determining a stroke command value based on the stroke command value controlling signal; and
    a pulse width modulation (PWM) signal generating unit for generating a PWM signal based on a difference between the stroke command value and the stroke, or generating a PWM signal based on the frequency varying signal,
    wherein the PWM signal generating unit analyzes the frequency varying signal, and generates the PWM signal to increase a frequency when the phase difference is more than a first preset range as a result of the analysis.

2. The apparatus of claim 1, further comprising an inverter for varying voltage and the frequency applied to a motor of the linear compressor based on the PWM signal.

3. The apparatus of claim 1, wherein the phase difference inflection point detecting unit outputs a control signal to maintain a present stroke command value when the phase difference inflection point is detected by the phase difference inflection point detecting signal.

4. The apparatus of claim 1, wherein the phase difference inflection point detecting unit outputs a control signal to increase a present stroke command value when the phase difference inflection point is not detected by the phase difference inflection point detecting signal.

5. The apparatus of claim 1, wherein if the phase difference is more than a minimum value within the first preset range at a time point, the phase difference inflection point detecting unit detects the time point as the phase difference inflection point.

6. An apparatus for controlling an operation of a linear compressor, comprising:
a controlling unit for detecting a phase difference between a current and a stroke, and outputting a frequency varying signal or a phase difference inflection point detecting signal based on the phase difference;
a phase difference inflection point detecting unit for judging whether to detect a phase difference inflection point or not by the phase difference inflection point detecting signal, and outputting a stroke command value controlling signal based on a result of the judgment;
a stroke command value determining unit for determining a stroke command value based on the stroke command value controlling signal; and
a pulse width modulation (PWM) signal generating unit for generating a PWM signal based on a difference between the stroke command value and the stroke, or generating a PWM signal based on the frequency varying signal,
wherein the PWM signal generating unit analyzes the frequency varying signal, and generates a PWM signal to decrease a frequency when the phase difference is less than a first preset range as a result of the analysis.

7. The apparatus of claim 1, wherein the controlling unit outputs the phase difference inflection point detecting signal when the detected phase difference is within the first preset range.

8. The apparatus of claim 1, wherein the controlling unit outputs the frequency varying signal when the phase difference is not within the first preset range.

9. The apparatus of claim 1, wherein the controlling unit calculates a speed of the stroke to detect a phase difference between the speed and the current, and compares the phase difference between the speed and the current with a reference phase difference to output the frequency varying signal or the phase difference inflection point detecting signal based on a result of the comparison.

10. The apparatus of claim 9, wherein the controlling unit outputs the phase difference inflection point detecting signal when the phase difference between the speed and the current is within a second preset range.

11. The apparatus of claim 9, wherein the controlling unit outputs the frequency varying signal when the phase difference between the speed and the current is not within a second preset range.

12. A method for controlling an operation of a linear compressor, comprising:
driving a linear compressor with a capacity corresponding to a stroke command value;
detecting a voltage and a current applied to a motor, and calculating a stroke based on the voltage and current;
detecting a phase difference between the stroke and the current;
comparing the phase difference with a preset value, and detecting a phase difference inflection point based on a result of the comparison;
detecting a TDC according to whether the phase difference inflection point has been detected, and then varying a stroke command value according to a load; and
generating a PWM signal based on a difference between the stroke command value and the stroke, or generating a PWM signal based on a frequency varying signal,
wherein the step of generating the PWM signal includes:
analyzing the frequency varying signal, and generating the PWM signal to increase a frequency when the phase difference is more than a first preset range as a result of the analysis.

13. The method of claim 12, wherein the step of detecting a phase difference inflection point includes varying a driving frequency if the phase difference is not within the first preset range.

14. The method of claim 13, wherein the step of varying the driving frequency includes:
increasing the frequency when the phase difference is more than the first preset range; and
decreasing the frequency when the phase difference is less than the first preset range.

15. The method of claim 13, wherein the step of detecting a phase difference inflection point includes:
varying a driving frequency if the detected phase difference is not within the first preset range; and
varying the phase difference inflection point if the detected phase difference is within the first preset range.

16. The method of claim 15, wherein the step of detecting a phase difference inflection point includes:
if the phase difference is more than a minimum value within the first preset range, detecting a time point as a phase difference inflection point.

17. The method of claim 12, wherein the step of varying a stroke command value includes:
if the phase difference inflection point is detected, maintaining the stroke command value; and
if the phase difference inflection point is not detected, increasing the stroke command value.

18. The apparatus of claim 6, wherein the phase difference inflection point detecting unit outputs a control signal to increase the stroke command value when the phase difference inflection point is not detected by the phase difference inflection point detecting signal.

19. The apparatus of claim 6, wherein the controlling unit outputs the phase difference inflection point signal when the detected phase difference is within the first preset range, or a frequency varying signal when the detected phase difference is not within the first preset range.

20. The apparatus of claim 6, wherein the controlling unit calculates a speed of the stroke to detect a phase difference between the speed and the current, and compares the phase difference between the speed and the current with a reference phase difference thus to output the frequency varying signal or the phase difference inflection point detecting signal based on a result of the comparison.

* * * * *